United States Patent [19]
Knodel et al.

[11] Patent Number: 5,139,549
[45] Date of Patent: Aug. 18, 1992

[54] APPARATUS AND METHOD FOR COOLING USING AQUEOUS ICE SLURRY

[75] Inventors: Bryan D. Knodel, San Angelo, Tex.; Richard J. Kooy, Western Springs, Ill.

[73] Assignee: Chicago Bridge & Iron Technical Services Company, Oak Brook, Ill.

[21] Appl. No.: 680,985

[22] Filed: Apr. 5, 1991

[51] Int. Cl.$^5$ .............................................. B01D 9/04
[52] U.S. Cl. ....................................... 62/532; 62/123; 62/434; 62/544
[58] Field of Search ................... 62/123, 532, 544, 434

[56] References Cited

U.S. PATENT DOCUMENTS

| | | | |
|---|---|---|---|
| 3,247,678 | 4/1966 | Mohlman | 62/199 |
| 3,675,436 | 7/1972 | Ganiaris | 62/544 |
| 3,869,870 | 3/1975 | Kuehner | 62/114 |
| 3,906,742 | 9/1975 | Newton | 62/332 |
| 4,004,886 | 1/1977 | Thijssen et al. | 62/544 |
| 4,452,302 | 6/1984 | Schoerner | 165/133 |
| 4,509,344 | 4/1985 | Ludwigsen et al. | 62/76 |
| 4,584,843 | 4/1986 | Pronger, Jr. et al. | 62/123 |
| 4,596,120 | 6/1986 | Knodel et al. | 62/59 |
| 4,754,610 | 7/1988 | Knodel et al. | 62/74 |
| 4,838,039 | 6/1989 | Knodel | 62/330 |
| 4,865,251 | 9/1989 | Briner | 237/8 R |
| 4,914,921 | 4/1990 | Knodel | 62/59 |
| 4,936,114 | 6/1990 | Engdahl et al. | 62/532 |

OTHER PUBLICATIONS

Winters, P. J. letter to Kaminsky, J. dated Apr. 11, 1990 reporting the status of DOE Contract No. DE-FG-01-88CE26559.

Winters, P. J., "Ice Slurry Hydraulic Characterization Testing of a Direct Freeze District Cooling System", Interim Report No. 1 for the U.S. Department of Energy Contract No. DE-FG01-88CE26559, Aug. 27, 1990.

Winters, P. J., "Simulation Loop Testing of a Direct Freeze District Cooling System", Interim Report No. 2 for the U.S. Department of Energy Contract No. CE-FG01-88CE26559, Jan. 24, 1991.

Primary Examiner—Ronald C. Capossela
Attorney, Agent, or Firm—Marshall, O'Toole, Gerstein, Murray & Bicknell

[57] ABSTRACT

An aqueous ice slurry is fed by a conduit from a freeze exchanger directly to one or more heat exchangers for cooling or air conditioning one of more enclosed or defined spaces. Warm water withdrawn from the heat exchangers is returned, with or without prior cooling, to the freeze exchanger to be converted into aqueous ice slurry. Warm water from the heat exchangers may be fed to a central thermal energy storage tank containing a bed of ice to cool the water and the cold water is fed to the freeze exchanger to form aqueous ice slurry. When heat exchangers have coils too small for an aqueous ice slurry to flow through the slurry is mixed with warm water from the heat exchangers to melt the ice and produce cold water which can be passed through the heat exchangers.

40 Claims, 3 Drawing Sheets

APPARATUS AND METHOD FOR COOLING USING AQUEOUS ICE SLURRY

FIELD OF THE INVENTION

This invention relates to apparatus and methods of cooling, such as for air conditioning one or more enclosed separated or defined spaces. More particularly, this invention is concerned with apparatus and methods using an aqueous ice slurry as the source of refrigeration for various cooling purposes such as to air condition one or more spaces, such as in a defined geographic district. The invention also includes the use of a central thermal energy storage tank in which ice is stored for cooling warm water returned from heat exchangers so that the resulting cold water can be used to produce an aqueous ice slurry fed to the heat exchangers.

BACKGROUND OF THE INVENTION

Air conditioning systems can be used to cool a plurality of separate spaces in the same building or a plurality of individual buildings in a defined geographic area or district as, for example, a university campus, a hospital, an office park, a governmental building complex, a shopping mall complex, or a theme or entertainment park.

Existing district cooling systems use a refrigeration apparatus which produces cold water, rather than an aqueous ice slurry, in a large central refrigeration system. The cold water, typically at 40° F., is fed through a piping network to the air handlers in the buildings where the building air is cooled. The resulting warm water at 55° F. is returned to the central refrigeration system to be cooled and then reused for cooling purposes. A major cost component for such district cooling system is the piping network which transports the cold supply water and the warm return water.

In recent years apparatus and methods have been developed for the production of aqueous ice slurries, as see the Knodel et al U.S. Pat. No. 4,596,120 and Schoerner et al U.S. Pat. No. 4,452,302. Aqueous ice slurries have many uses such as in food processing and storage, industrial processes and in air conditioning.

Mohlman U.S. Pat. No. 3,247,678 discloses the use of an ice-brine slurry for air conditioning. An ice-brine slurry from a single refrigeration station is used to supply a plurality of paying users with refrigeration. Air to be cooled is passed in indirect heat exchange relationship with the ice-brine slurry whereby the latent heat for melting of the ice is used to cool the air. The warm water is returned directly to the refrigeration plant in which the ice slurry is produced. The ice slurry is sent to a head tank for storage rather than being sent directly to the paying users. This system will typically require mechanical agitation to keep the stored slurry in a fluid state.

Kuehner U.S. Pat. No. 3,869,870 discloses production of a slurry of ice crystals in a water immiscible carrier, such as toluene, which is circulated to one or a plurality of heat exchangers where it flows through the coils for absorbing heat from a load by means of the melting ice. The two liquids are then forwarded to a receiver where they separate into two phases. The liquid water from the melted ice and the carrier fluid are returned separately to the ice forming unit prior to recirculating the slurry through the system. The process does not include thermal energy storage, such as ice stored in a tank, for any purpose.

Newton U.S. Pat. No. 3,906,742 discloses direct mixing of water with a water-immiscible liquid refrigerant which does not form hydrates with water. An ice slurry in liquid refrigerant is circulated to one or a plurality of individual air handling units which may be connected in a closed loop single pipe system. The ice-refrigerant slurry is stored at high concentration ready for recirculation when needed and typically requiring agitation to keep the slurry in a fluid state. The reference does not disclose formation of an aqueous ice slurry with water as the carrier in a refrigeration plant and direct feeding of the resulting slurry with water as the carrier to a heat exchanger means. The reference states that liquid refrigerant, not water, is the principal carrier of the ice crystals to the heat exchanger. Also, the reference does not disclose the use of thermal storage of ice in a storage tank for cooling the returning fluid from the heat exchanger means.

Pronger et al U.S. Pat. No. 4,584,843 discloses that ice can be stored in a tank and be used to cool water for air conditioning purposes. Cold water can be removed from the tank and fed through a heat exchanger cooling coil in a building or the like for cooling purposes. Warm water removed from the heat exchanger can be returned to the storage tank to be cooled by direct contact with the ice in the tank. The system of this reference provides the load management benefits of thermal storage but not ice slurry circulation benefits.

The latent heat of ice, combined with the additional sensible heat available due to the lower temperature, greatly increase the energy absorbing capacity per pound of aqueous ice slurry circulated compared to water. In new systems, the size of the distribution piping to meet a given cooling load can be substantially lowered. This is because the increase in the energy capacity of the ice slurry can be 3.5 times greater than that of chilled water. This can be translated into a decrease in flow of over 70% to meet the same cooling load.

The above-described potential advantages in using an aqueous ice slurry are not readily achievable with many of the air handlers now in use and commercially available because the air handler heat exchanger coil is often incapable of handling an ice slurry, for which they were not designed. Areas of slow flow, or recirculating flow, allow the ice to accumulate and block the coil. Also, a lower flow rate for an ice slurry and a decrease in pumping power for an ice slurry can lead to a reduction in the heat transfer coefficient within the coil so that to maintain capacity either a large temperature difference or more coil surface area is needed. Finally, existing air handlers were not designed to handle the very low temperatures associated with ice slurries. A conventional system typically operates with a 40° F. entering water temperature and a 55° F. exiting water temperature. If the water is too cold, moisture in the air may condense on the coil surface causing the air to be dry and equipment to corrode.

From the above discussion it is clear that a need exists for apparatus and methods which will eliminate some or many of the above problems yet maintain many of the advantages inherent in the use of aqueous ice slurries for various cooling purposes, including air conditioning, especially for district cooling. There is also a need for central thermal energy storage, such as ice in a tank, which can be efficiently used in combination with a refrigeration system which produces an aqueous ice slurry which is used as the primary source for cooling purposes.

SUMMARY OF THE INVENTION

The present invention utilizes an aqueous ice slurry as the source of cooling and refrigeration. The aqueous ice slurry can be produced using available methods and apparatus. The aqueous ice slurry may be fed by suitable conduit means from the freeze exchanger directly to one or more heat exchangers for cooling or air conditioning one or more enclosed or defined processes or spaces which can be relatively close to the freeze exchanger or spaced outwardly a considerable distance therefrom.

Warm water is withdrawn from the heat exchangers and can then be returned, with or without prior cooling, to the freeze exchanger to be converted into aqueous ice slurry. Warm water withdrawn from the heat exchangers, and produced from an ice slurry fed directly into the heat exchangers, is advisably fed to a central thermal energy storage tank containing a bed of ice to cool the water and the cold water is then fed to the freeze exchanger to be converted to aqueous ice slurry.

Since some heat exchangers have coils and the like with flow paths too small for an aqueous ice slurry to flow through without blockages forming, the aqueous ice slurry may be combined and mixed with enough of the stream of warm water withdrawn from the heat exchangers to produce a cold stream of water essentially devoid of ice which can then be passed through the heat exchangers for cooling and refrigeration purposes. This system may be successfully used when the heat exchangers comprise air handlers, particularly air handlers which have been in use for quite a few years. Additionally, this system can be optimized by feeding warm water withdrawn from the heat exchangers into contact with a bed of ice in a central thermal energy storage tank to cool the water before it is returned to the freeze exchanger.

By including a central thermal energy storage tank in the system, the freeze exchanger can be operated during evening hours and weekends, when energy is more readily available at lower cost, to produce aqueous ice slurry most or all of which can then be fed to the storage tank since cooling and air conditioning requirements are minimal at such times. This stored ice reserve thus is available to cool the warm water from the heat exchangers before the water is fed to the freeze exchanger. Such prior water cooling permits a substantial reduction in the size of the freeze exchanger which would otherwise be required were the warm water to be fed directly to the freeze exchanger.

During periods of low or no cooling loads, all or a portion of the aqueous ice slurry is sent to the ice storage tank. There are several advantages to this system. The need for energy-consuming mechanical agitation in the storage tank is minimized because the thermal storage discharge occurs by the melting of a static ice bed. Only minimal capacity control is required on the freeze exchanger or refrigeration system since it can be run at full capacity and optimum efficiency or be substantially shut off. Also, the freeze exchanger can be sized for the average cooling load rather than the peak load and the full energy capacity of the ice slurry can be employed. Additionally, time of day energy savings on electrical demand and energy charges can be realized.

According to one aspect of the invention a cooling apparatus is provided comprising freeze exchanger means in which an aqueous ice slurry is produced; an aqueous ice slurry distribution conduit having an inlet communicating with the freeze exchanger means and an outlet communicating with a mixer in which water and ice slurry are mixed, the ice is melted and cold water is formed; a heat exchanger through which fluid flows and is cooled by indirect heat exchange with cold water flowing through a heat exchanger therein; a cold water conduit for feeding cold water from the mixer to the heat exchanger; recycling means for withdrawing warm water from the heat exchanger means and feeding the water to the freeze exchanger means to produce additional aqueous ice slurry; and a warm water recirculation conduit for recirculating warm water from the warm water return conduit to the mixer to melt ice in the aqueous ice slurry.

The recycling means can include a warm water return conduit having a control valve downstream of the warm water recirculation conduit. The control valve can proportion the amount of water fed to the freeze exchanger.

A suitable means which is responsive to the temperature of the cooled fluid downstream of the heat exchanger can be included to regulate the control valve. Also, a recirculation pump can be located in the warm water recirculation conduit.

In another embodiment of the invention cooling apparatus is provided comprising freeze exchanger means in which an aqueous ice slurry is produced; an aqueous ice slurry distribution conduit having an inlet communicating with the freeze exchanger means and an outlet communicating with a mixer in which water and ice slurry are mixed, the ice is melted and cold water is formed; a heat exchanger through which fluid flows and is cooled by indirect heat exchange with cold water flowing through the heat exchanger; a cold water conduit for feeding cold water from the mixer to the heat exchanger; a warm water return conduit for withdrawing warm water from the heat exchanger and feeding the warm water to an ice storage tank to cool the water; a conduit for withdrawing cold water from the ice storage tank and feeding it to the freeze exchanger to produce aqueous ice slurry; and a warm water recirculation conduit for recirculating warm water from the warm water return conduit to the mixer to melt ice in the aqueous ice slurry.

The described apparatus can include a conduit for diverting aqueous ice slurry from the aqueous ice slurry distribution conduit to the ice storage tank.

In another embodiment of the invention a cooling apparatus is provided comprising a freeze exchanger means in which an aqueous ice slurry is produced; at least first and second spaced apart separate heat exchangers into which a fluid can flow and be cooled by indirect heat exchange with cold water flowing through the heat exchangers; an aqueous ice slurry distribution conduit having an inlet communicating with the freeze exchangers; a first branch conduit communicating with the ice slurry distribution conduit and with a first mixer in which water and ice slurry are mixed, the ice is melted and cold water is formed; a cold water conduit for feeding cold water from the first mixer to the first heat exchanger; a first warm water return branch conduit for withdrawing warm water from the first heat exchanger and feeding it to a main warm water recycling means to return the water to the freeze exchanger means; a first warm water recirculation conduit for recirculating warm water from the first warm water return branch conduit to the first mixer to melt ice in the aqueous ice slurry; a second branch conduit communicating with the ice slurry distribution conduit and with a second mixer in which water and ice slurry are mixed, the ice is melted and cold water is formed; a cold water conduit for feeding cold water from the second mixer and to the second heat exchanger; a second warm water return branch conduit for withdrawing warm water form the second heat exchanger and feeding it to the main warm water recycling means to return the water to the freeze exchanger means; and a second warm water recirculation conduit for recirculating warm water from the second warm water return branch conduit to the second mixer to melt ice in the aqueous ice slurry.

Each of the first and second warm water return branch conduits can include a control valve downstream of the respective first and second warm water recirculation conduits. Also, means which is responsive to the temperature of the cooled fluid downstream of the heat exchanger can be included in each of the heat exchangers to regulate the control valve. In addition, a recirculation pump can be located in each of the warm water recirculation conduits.

The apparatus just described can include an ice storage tank to which warm water from the main or central warm water return conduit is fed to cool the water, and a conduit for withdrawing cold water from the ice storage tank and feeding the cold water to the freeze exchanger to produce aqueous ice slurry. One benefit of returning warm water to a central ice storage tank is that central thermal energy storage can thereby be used to cool the warm water theoretically to 32° F.-33° F. cold water. By feeding cold water, rather than warm water, to the freeze exchanger a smaller freezer exchanger can be used to produce the aqueous ice slurry than would be required with warm water. To achieve this benefit, the apparatus can include a conduit for diverting aqueous ice slurry from the aqueous ice slurry distribution conduit to the ice storage tank. This permits ice made at nighttime, when it may not be needed for cooling purposes, to be put in storage.

Apparatus also provided by the invention includes freeze exchanger means in which an aqueous ice slurry is produced; an aqueous ice slurry distribution conduit having an inlet communicating with the freeze exchanger means and an outlet communicating with a heat exchanger means into which the slurry can flow in indirect heat exchange with a fluid which is cooled and the slurry is converted to warm water; a warm water return conduit for withdrawing warm water from the heat exchanger means and feeding the warm water to an ice storage tank to cool the water; and a conduit for withdrawing cold water from the ice storage tank and feeding it to the freeze exchanger means to produce aqueous ice slurry.

The invention also provides a cooling method comprising producing an aqueous ice slurry in a freeze exchanger means; feeding the aqueous ice slurry by means of a distribution conduit to a heat exchanger means; and withdrawing warm water from the heat exchanger means and feeding the warm water through ice in a storage tank to cool the water by heat exchange with the ice and then feeding the resulting cold water to the freeze exchanger means to produce aqueous ice slurry. The method can include feeding aqueous ice slurry produced in the freeze exchanger means to the ice storage tank.

In a further aspect of the invention a cooling method is provided comprising producing an aqueous ice slurry in a freeze exchanger means; feeding the aqueous ice slurry by means of a distribution conduit to a mixer; feeding water to the mixer to dissolve the ice and produce cold water; feeding the cold water from the mixer through a heat exchanger through which a fluid flows to thereby indirectly cool the fluid; and withdrawing warm water from the heat exchanger and feeding some of the water to the mixer to melt ice and recycling some of the water to the freeze exchanger to produce additional aqueous ice slurry.

The amount of water returned or recycled to the freeze exchanger means can be controlled in response to the temperature of the cooled fluid downstream of the heat exchanger. Also, the recycled warm water can be fed into contact with ice in a storage tank to cool the water by heat exchange with the ice and the resulting cold water can be fed to the freeze exchanger means to produce aqueous ice slurry. Furthermore, at various times all or part of the aqueous ice slurry produced in the freeze exchanger means can be fed to the ice storage tank.

The temperature of the warm water leaving the heat exchanger may be controlled by regulating the warm water recirculation flow rate so that there is a controlled high return temperature. The amount of warm water fed to the mixer can be correlated with the amount of ice slurry fed to the mixer so that all of the ice is melted and the temperature of the return warm water is controlled.

The described storage of thermal energy, such as ice in a storage tank at a central location for district cooling, has advantages over the use of distributed storage at each user's location. Some of the advantages of central storage include the elimination of tank storage space at each user's site; the reduction of tank costs due to construction economy of scale; the reduction in operation and maintenance associated with multiple tanks and controls; and the use of compact diameter piping or conduits wherein the increase in capacity to meet peak load is offset by using sensible heat in return water.

To those skilled in the art it will be obvious that in the above discussion the heat exchanger may be an air handler and the fluid to be cooled may be air.

DETAILED DESCRIPTION OF THE DRAWINGS

To the extent it is reasonable and practical the same or similar elements which appear in the various drawings will be identified by the same numbers.

Figure 1:
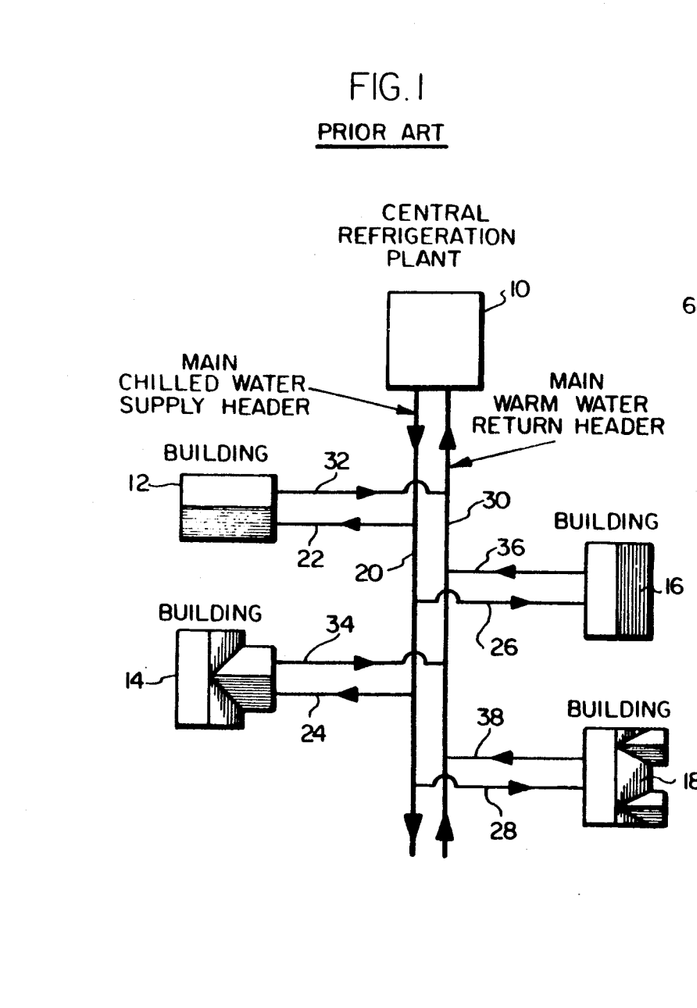
FIG. 1 is a schematic drawing illustrating a prior art embodiment of apparatus for cooling a plurality of buildings using a central freeze exchanger or central refrigeration plant.

With reference to FIG. 1, it illustrates a prior art district cooling system which consists of a large central refrigeration plant 10 which is used to provide chilled water, typically at 40° F., to cool multiple buildings 12, 14, 16 and 18. The chilled water produced in the refrigeration plant 10 is fed to main chilled water supply header 20. Header 20 feeds chilled water to conduit 22 which delivers it to a coil in an air handler (not shown) located in building 12. Warm air, flowing around the coil, is cooled by indirect heat exchange with the chilled water flowing in the coil. The cooled air is then circulated throughout the building to provide air conditioning or cooling. The resulting warm water, typically at 55° F., formed in the coil is fed to conduit 32 which delivers it to main warm water return header 30 to be recycled to refrigeration plant 10 to be chilled again.

Each of the other three buildings 14, 16 and 18 is air conditioned as described in regard to building 12. Thus, chilled water is withdrawn from chilled water supply header 20 by conduits 24, 26 and 28 and fed to a coil in an air handler (not shown) in the respective buildings 14, 16 and 18. The resulting warm water is removed from the coil in each building by a respective conduit 34, 36, 38 which feeds the warm water to main return header 30.

As previously explained one of the major cost components for such prior art district cooling systems is the piping network which connects the buildings to the central plant. Also, the energy consumption required to pump the large volumes of water through the system is very high.

Figure 2:
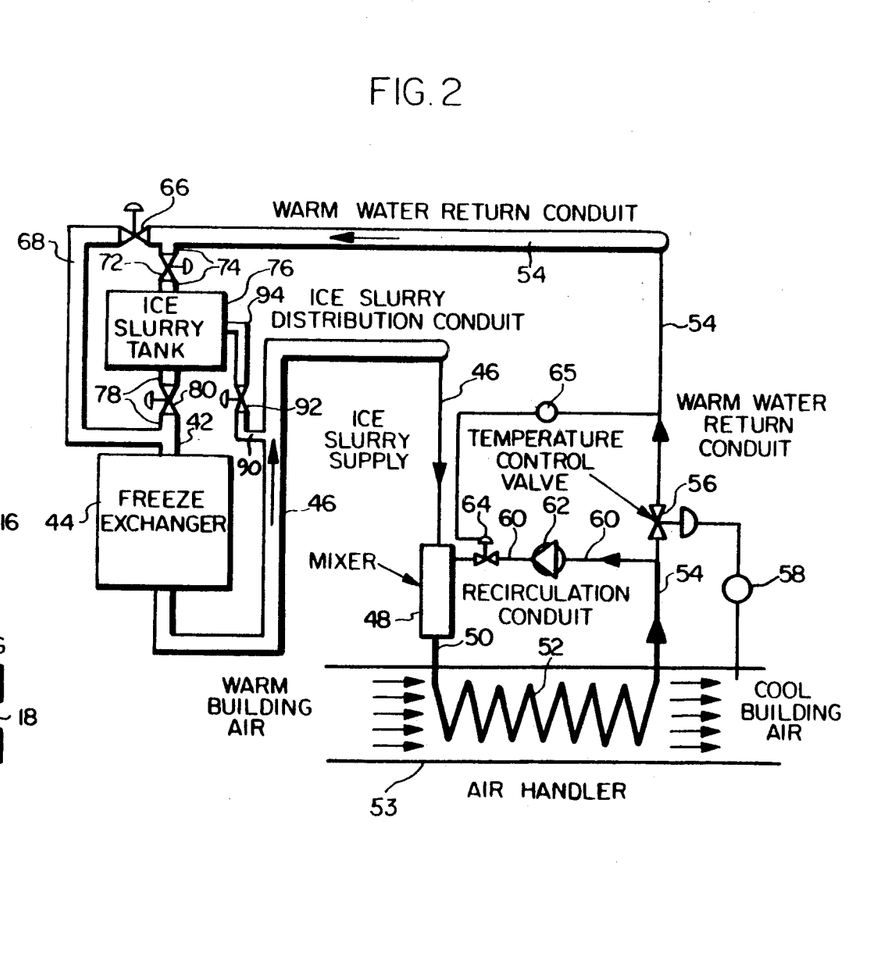
FIG. 2 is a schematic drawing illustrating an apparatus according to the invention for cooling a single enclosed space, such as a building, wherein the heat exchanger is an air handler.

FIG. 2 of the drawings illustrates one embodiment of the invention suitable for cooling or air conditioning a single space or zone or volume, whether divided into compartments or rooms, such as a building.

Conduit 42 supplies water to freeze exchanger 44 in which an ice slurry is produced. Schoerner et al U.S. Pat. No. 4,452,302 discloses an indirect freeze exchanger which may be used in the described apparatus. Apparatus and methods of producing an ice slurry by direct contact of a refrigerant with water are disclosed in the Knodel et al U.S. Pat. No. 4,596,120 and Knodel U.S. Pat. No. 4,838,039. The ice slurry is fed from freeze exchanger 44 to ice slurry distribution conduit 46 which delivers the ice slurry to mixer 48. Warm water is fed to mixer 48 by warm water recirculation conduit 60 which contains a pump 62.

The temperature of the warm water leaving the air handler is advisably controlled by regulating the warm water recirculation flow rate so that there is a controlled high return temperature. The supply of the warm water fed to the mixer 48 is correlated with the amount of ice slurry fed to the mixer 48 by ice slurry conduit 46 so that all of the ice is melted in the mixer and the temperature of the return warm water is controlled. An alternative way to control the warm water return temperature is to use a variable speed pump, instead of a constant speed pump, for pump 62. This will permit elimination of valve 64.

The cold water is withdrawn from mixer 48 by conduit 50 which feeds it to coil 52 in air handler 53. Warm air, such as in a building, is forced through the air handler 53 and as the air flows around the coil 52 it is cooled by indirect heat exchange with the cold water flowing through coil 52. The cooled air is then circulated in the building to provide air conditioning. The described heat exchange warms the water in the coil 52. The warm water is fed from the coil 52 to warm water return conduit 54 which contains a temperature control valve 56 which is regulated by a temperature controller 58 responsive to the temperature of the cool air exiting the air handler 53.

Some of the warm water is diverted from the warm water return conduit 56, downstream of the coil 52 but upstream of the control valve 56, into recirculation conduit 60 which feeds it to mixer 48.

To maintain the desired temperature of air leaving the air handler 53, the flow of ice slurry in conduit 46 to the cooling load is modulated. To avoid potential problems with ice plugging, the temperature control valve 56 is not installed in the ice slurry supply line; rather, the temperature control valve is installed on the warm water return line 54. When the warm water flow leaving the air handler is restricted the ice slurry flow entering the air handler is also restricted. During periods of low cooling loads the flow control valve 56 will close in response to any drop in the building air temperature; as a result, the flow of slurry into the mixer 48 will be reduced causing the equilibrium temperature of the water entering the air handler 53 to rise, thereby reducing the cooling being provided to the air.

To minimize the flow of ice slurry to the remote mixer 48, it is desirable to utilize the maximum cooling capacity available in the ice slurry and this will occur when the return water temperature in conduit 54 is at it's highest possible value. This is accomplished by regulating the water flow through the recirculation pump 62 to maintain the desired flow rate. This is achieved by control valve 64 positioned in conduit 60 between pump 62 and mixer 48. Temperature controller 65 controls valve 64 according to the temperature of the warm water in conduit 54. The return water temperature is thus controlled independently of the air temperature in the air handler.

The warm water can be delivered by warm water return conduit 54 through open valve 66 to conduit 68 which delivers it to conduit 42 to be returned to the freeze exchanger 44 to be converted again to an ice slurry. When the warm water is recycled as just described the valve 72 in conduit 70 is closed as is the valve 80 in conduit 78.

Although the warm water can be fed by the warm water return conduit 54 and associated conduits 68 and 42 directly to the freeze exchanger it is generally more advantageous to first cool the warm water before feeding it to the freeze exchanger 44. This can be done by including an ice slurry storage tank 76 in the apparatus. Pronger et al U.S. Pat. No. 4,584,843 discloses such a tank. With valve 66 closed the warm water from conduit 54 passes through conduit 74, with valve 72 therein open, into ice slurry storage tank 76. The warm water is cooled as it flows through the ice particles. The cooled water is removed from tank 76 through outlet conduit 78, containing valve 80 which has been opened, and fed to conduit 42 for delivery to freeze exchanger 44. This provides thermal storage without the necessity of keeping the stored ice in a fluid state.

To maintain an adequate supply of ice in tank 76, some of the ice slurry can be diverted from conduit 46 to conduit 90, through valve 92 to conduit 94 which delivers it to tank 76. Such diversion of ice slurry would probably take place during nighttime when air conditioning requirements are lower or unnecessary and electric power consumption is lower and rates are often less.

The described apparatus is particularly useful in conjunction with air handlers 53 which contain a coil 52 designed to handle cold or cool water flow as distinguished from a heat exchanger which is specifically designed to allow flow of an ice slurry therethrough without clogging or obstructing the passages. The apparatus can thus be used in conjunction with existing air handlers already in buildings. Other piping or conduits used to feed chilled water from a refrigeration plant can be replaced with small conduits suitable for handling an ice slurry and feeding it to a mixer 48. This will lower subsequent pumping energy consumption and repair and replacement costs. In new buildings air handlers of proven design need only be installed with piping used which is suitable for handling an ice slurry instead of conduits capable of handling the larger volume of chilled water which would otherwise be needed.

Figure 3:
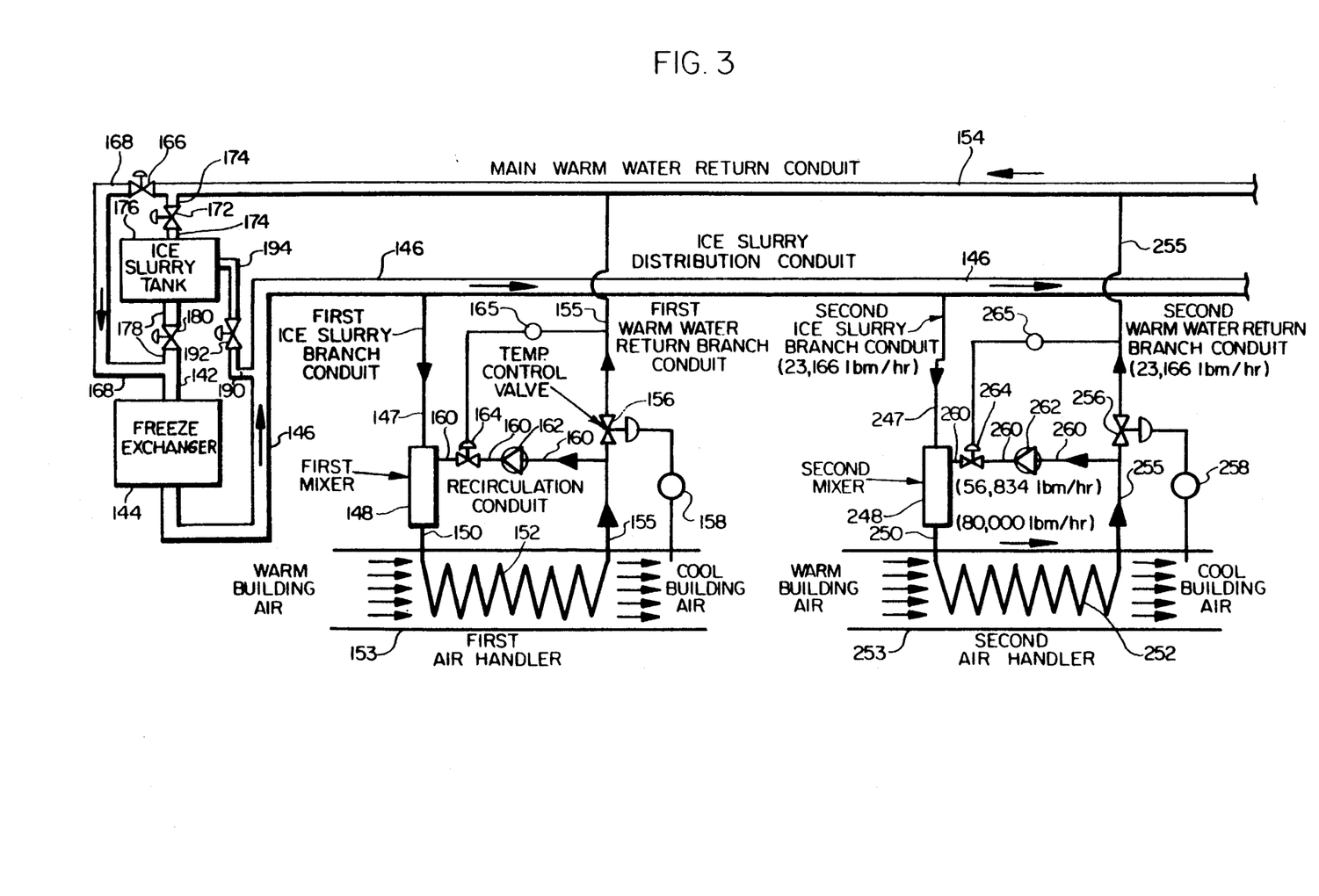
FIG. 3 is a schematic drawing illustrating an apparatus according to the invention for cooling a plurality of enclosed and separated spaces, wherein the heat exchangers are air handlers.

FIG. 3 of the drawings illustrates a second embodiment of the invention for cooling or air conditioning a plurality of spaces or zones or volumes, such as a series of buildings at a university, health care institution or a governmental building complex.

Conduit 142 supplies water to freeze exchanger 144 in which an ice slurry is produced. The ice slurry is fed from freeze exchanger 144 to ice slurry distribution conduit 146 which delivers ice slurry to a first ice slurry branch conduit 147 which feeds it to a first mixer 148. Warm water is fed to first mixer 148 by a first warm water recirculation conduit 160 which contains a first pump 162.

The supply of the warm water fed to the first mixer 148 may be correlated with the amount of ice slurry fed to the first mixer 148 by the first ice slurry branch conduit 147 so that all of the ice is melted in the first mixer 148 without raising the temperature of the cold water more than necessary. For many operations the temperature of the warm water can be fixed and, thus, only the supply of the warm water need be correlated with the amount of ice slurry.

The cold water is withdrawn from first mixer 148 by conduit 150 which feeds it to coil 152 located in a first air handler 153. Warm air, such as in a first building, is forced through a first air handler 153 and as the air flows around the coil 152 it is cooled by indirect heat exchange with the cold water flowing in the coil 152. The cooled air is then circulated in a building to provide air conditioning. The described heat exchange warms the water in the coil 152. The warm water is fed from the coil 152 to a first warm water return branch conduit 155 which contains a temperature control valve 156 which is regulated by a temperature controller 158 responsive to the temperature of the cool air exiting the air handler 153. The amount of warm water which is fed from the first warm water return branch conduit 155 to the main warm water return conduit 154 depends upon the incoming ice fraction but, generally, the recycle flow to the mixer 148 is much larger than the return flow to the freeze exchanger.

Some of the warm water is diverted from the first warm water return branch conduit 155, downstream of the coil 152 but upstream of the control valve 156, into recirculation conduit 160 which feeds it to first mixer 148.

To minimize the flow of ice slurry to the mixer 148, the maximum cooling capacity available in the ice slurry should be used. This will occur when the return water temperature in conduit 155 is high. For this purpose the water flow through the recirculation pump 62 is regulated for a desired flow rate which is achieved by control valve 164 positioned in conduit 160 between pump 162 and mixer 148. Temperature controller 165 controls valve 164 according to the temperature of the warm water in conduit 155. The return water temperature is thus controlled independently of the air temperature in the air handler 153. While pump 162 can be a constant speed pump, it can also be a variable speed pump the use of which may eliminate the need for valve 164 to control the warm water return temperature.

Ice slurry distribution conduit 146 also delivers ice slurry to a second ice slurry branch conduit 247 which feeds the ice slurry to a second mixer 248. Warm water is fed to second mixer 248 by a second warm water recirculation conduit 260 which contains a second pump 262. The supply and temperature of the warm water fed to the second mixer 248 may be correlated with the amount of ice slurry fed to the second mixer 248 by the second ice slurry branch conduit 247 so that all of the ice is melted in the second mixer 248 without raising the temperature of the cold water more than necessary. However, the temperature of the warm water can be fixed and in that case only the warm water supply need be correlated with the amount of ice slurry.

The cold water is withdrawn from second mixer 248 by conduit 250 which feeds it to second coil 252 located in a second air handler 253. Warm air, such as in a second building, is forced through a second air handler 253 and as the air flows around the second coil 252 it is cooled by indirect heat exchange with the cold water flowing in the coil 252. The cooled air is then circulated in a building to provide air conditioning. The described heat exchange warms the water in the second coil 252. The warm water is fed from the coil 252 to a second warm water return branch conduit 255 which contains a temperature control valve 256 which is regulated by a temperature controller 258 responsive to the temperature of the cool air exiting the second air handler 253.

Some of the warm water is diverted from the first warm water return branch conduit 255, downstream of the second heat exchanger 252 but upstream of the control valve 256, into a second recirculation conduit 260 containing a pump 262 which feeds it to mixer 248. The supply and temperature of the warm water fed to the second mixer 248 may be correlated with the amount of ice slurry fed to the second mixer 248 by the second ice slurry branch conduit 247 so that all of the ice is melted in the second mixer 248 without raising the temperature of the cold water more than necessary. However, the temperature of the warm water can be fixed and in that case only the supply of warm water need be correlated with the supply of ice slurry. To minimize the flow of ice slurry to the remote mixer 248, it is desirable to utilize the maximum cooling capacity available in the ice slurry. This occurs when the return water temperature in conduit 255 is at maximum value. This is accomplished by regulating the water flow through the recirculation pump 262 to maintain the desired flow rate. This is achieved by control valve 264 positioned in conduit 260 between pump 262 and mixer 248. Temperature controller 265 controls valve 264 according to the temperature of the warm water in conduit 255. The return water temperature is thus controlled independently of the air temperature in the air handler 253. The described control system is suitable for use with a constant speed pump 262. However, if a variable speed pump is used for pump 262, valve 264 may be unnecessary to obtain the same desired warm return water temperature.

The warm water can be delivered by warm water return conduit 154 through open valve 166 to conduit 168 which delivers it to conduit 142 to be returned to the freeze exchanger 144 to be converted again to an ice slurry. When the warm water is recycled as just described, the valve 172 in conduit 174 is closed as is the valve 180 in conduit 178.

Although the warm water can be fed by the warm water return conduit 154 and associated conduits 168 and 142 directly to the freeze exchanger 144, it is generally advantageous to first cool the warm water before feeding it to the freeze exchanger 144. This can be done by including an ice slurry storage tank 176 in the apparatus. Pronge et al U.S. Pat. No. 4,584,843 discloses such a tank. With valve 166 closed the warm water from conduit 154 passes through conduit 174, with valve 172 therein open, into ice slurry storage tank 176. The warm water is cooled as it flows through the ice particles. The cooled water is removed from tank 176 through outlet conduit 178, containing valve 180 which has been opened, and is fed to conduit 142 for delivery to freeze exchanger 144. In this manner, the ice in tank 176 can be used to provide thermal storage without requiring removal of the ice from the tank as a slurry.

The described apparatus is particularly useful in conjunction with air handlers which contain a coil 152, 252 designed to handle cold or cool water flow as distinguished from a heat exchanger which is specifically designed to allow flow of an ice slurry therethrough without clogging or obstructing the passages. The apparatus can thus be used in conjunction with existing air handlers now in buildings. Other piping or conduits used to feed chilled water from a refrigeration plant can be replaced with small conduits suitable for handling an ice slurry and feeding it to a mixer 148, 248. This will lower subsequent pumping energy consumption and repair and replacement costs. In new buildings, air handlers of proven design need only be installed with piping used which is suitable for handling an ice slurry instead of conduits capable of handling the larger volume of chilled water which would otherwise be needed.

The ice slurry storage tank 176 can be supplied with ice slurry by diverting ice slurry from conduit 146 to conduit 190, through valve 192 to conduit 194 which delivers the ice slurry to tank 176. During periods of low or no cooling loads, all or a portion of the ice slurry is sent to the ice slurry storage tank. There are several advantages to this system. Minimal capacity control is required on the refrigeration system since it can be run at full capacity and optimum efficiency or be shut off. Also, the refrigeration system can be sized for the average cooling load rather than the peak load and the full energy capacity of the ice slurry can be employed. Additionally, time of day energy savings on electrical demand and energy charges can be realized.

With further reference to FIG. 3, if the air handler 253 has a design cooling load of 1,200,000 BTU/hr., the entering water temperature is 40° F., the leaving water temperature is 55° F. and the water flow rate is 80,000 lbm/hr. (160 gpm) and with a 20% ice slurry at 32° F. available at second branch conduit 247, the amount of ice slurry required at 100% load capacity would be 23,166 lbm/hr. Of the warm water leaving the coil 252, about 56,834 lbm/hr. would be recirculated by conduit 260 to mixer 248 and 23,166 lbm/hr. would be recycled by the second warm water return branch conduit 255 to main warm water return conduit 154. The amount of ice slurry required at 50% load capacity would be 11,583 lbm/hr. Of the warm water leaving the coil 252, about 28,417 lbm/hr. would be recirculated by conduit 260 to mixer 248 and 11,583 lbm/hr. would be recycled by the second warm water return branch conduit 255 to main warm water return conduit 154.

Figure 4:
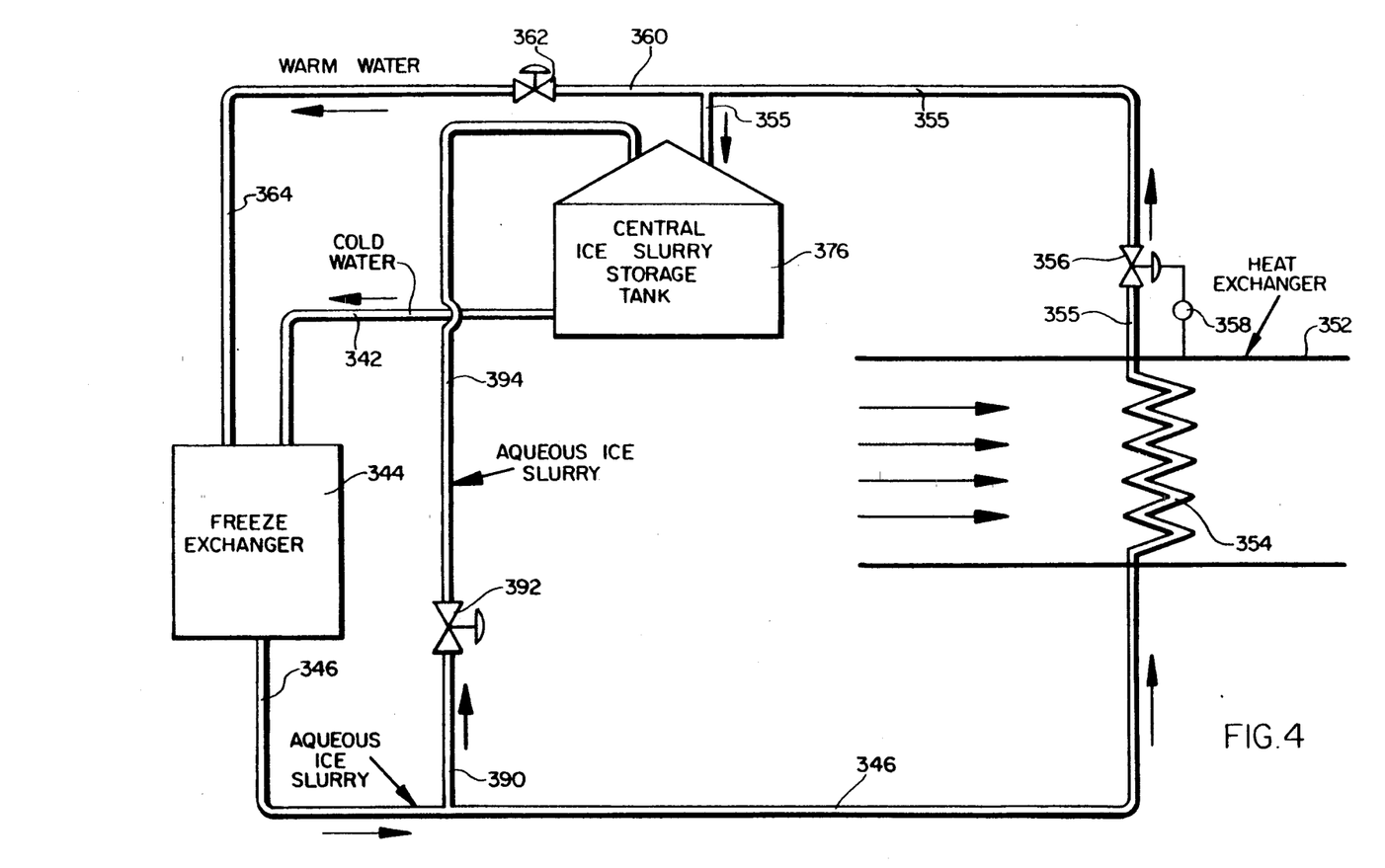
FIG. 4 is a schematic drawing illustrating apparatus according to the invention in which an aqueous ice slurry is normally fed directly to a heat exchanger and warm water from the heat exchanger is then cooled in an ice storage tank before being fed to a freeze exchanger.

FIG. 4 of the drawings illustrates a further apparatus embodiment of the invention suitable for various cooling purposes including air conditioning a single space or zone or volume, whether divided into compartments or rooms, such as a building. In this embodiment, an aqueous ice slurry is fed directly to the heat exchanger without first melting the ice to produce cold water.

With reference to FIG. 4, conduit 342 supplies water to freeze exchanger 344 in which an aqueous ice slurry is produced. The aqueous ice slurry is fed from freeze exchanger 344 to aqueous ice slurry distribution conduit 346 which delivers the aqueous ice slurry to coil 354 in a heat exchanger, shown as an air handler 352. Any suitable fluid such as air or water can be cooled by passing it through the heat exchanger 352. As the fluid flows around the coil 354 the fluid is cooled by indirect heat exchange with the aqueous ice slurry flowing through the heat exchanger. When the fluid is air the cooled air can be circulated in a building to provide air conditioning. The described heat exchange converts the slurry in coil 354 to warm water. The warm water can be fed from the coil 354 to warm water return conduit 355 which contains a temperature control valve 356 which is regulated by a temperature controller 358 responsive to the temperature of the fluid exiting the heat exchanger 352 and which can be an air handler. The temperature of the warm water leaving the air handler can be controlled by regulating the recirculation flow rate so that there is a controlled high return temperature as described previously.

The warm water is delivered by warm water return conduit 355 to ice storage tank 376. The warm water is cooled as it flows through a bed of ice in storage tank 376. The cold water theoretically at 32° F.-33° F. is removed from storage tank 376 by conduit 342 and is fed to freeze exchanger 344 to be converted to an aqueous ice slurry which is then fed by conduit 346 to heat exchanger 352. It is generally not economically advantageous to remove an ice slurry from tank 376 because the ice particles adhere together and form a porous bed which cannot be piped out without first being converted to a slurry in one way or another.

To maintain an adequate supply of ice in storage tank 376, some of the ice slurry can be diverted from conduit 346 to conduit 390, and then fed through valve 392 to conduit 394 which delivers it to tank 376. Such diversion of ice slurry would probably take place when electric power consumption is lowest and electric rates are favorable. Furthermore, by first cooling the warm water withdrawn from the heat exchanger before the water is fed to the freeze exchanger 344, ice is more quickly produced with lower energy consumption than when the warm water is fed directly from conduit 355 to conduit 360 containing valve 362 and then to conduit 364 for delivery to the freeze exchanger 344. As a result, a smaller freeze exchanger or refrigeration plant can be used with a substantial savings in capital investment and operating cost. However, sometimes it may be desirable according to the load on the system to feed the warm water from conduit 355 to conduits 360,364 and thus directly to the freeze exchanger. It should also be understood that the embodiment illustrated by FIG. 4 is particularly useful with heat exchangers of a design suitable for handling an ice slurry instead of handling the larger volume of chilled water which would otherwise be needed.

The foregoing detailed description has been given for clearness of understanding only, and no unnecessary limitations should be understood therefrom, as modifications will be obvious to those skilled in the art.

What is claimed is:

1. A cooling apparatus comprising:
    freeze exchanger means in which an aqueous ice slurry is produced;
    an aqueous ice slurry distribution conduit having an inlet communicating with the freeze exchanger means and an outlet communicating with a mixer in which warm water and aqueous ice slurry are mixed and the ice is melted and cold water is formed;
    a heat exchanger means into and out of which a fluid flows and is cooled by indirect heat exchanger with cold water flowing through the heat exchanger means and forming warm water;
    a cold water conduit for feeding cold water from the mixer to the heat exchanger means;
    recycling means for withdrawing warm water from the heat exchanger means and feeding the warm water to the freeze exchanger means to produce additional aqueous ice slurry; and
    a warm water recirculation conduit communicating with the heat exchanger means and with the mixer for recirculating warm water from the heat exchanger means to the mixer to melt ice in the aqueous ice slurry.

2. Apparatus according to claim 1 in which:
    the recycling means includes a warm water return conduit having a control valve downstream of the warm water recirculation conduit.

3. Apparatus according to claim 2 in which the heat exchanger means is in an air handler and the air handler includes means which is responsive to the temperature of the air downstream of the air handler to regulate the control valve.

4. Apparatus according to claim 1 including:
    control means for controlling the flow of warm water from the heat exchanger means to the freeze exchanger means in response to the temperature of the cooled fluid.

5. Apparatus according to claim 1 including a recirculation pump in the warm water recirculation conduit.

6. Apparatus according to claim 1 including:
    control means for controlling the recirculation flow rate of warm water to the mixer by means of the temperature of the warm water in the recycling means.

7. Apparatus according to claim 1 including:
    control means for controlling the flow rate of warm water to the mixer by measuring the temperature of the warm water in the recycling means.

8. Apparatus according to claim 7 in which the control means includes a variable speed pump.

9. A cooling apparatus comprising:
    freeze exchanger means in which an aqueous ice slurry is produced;
    an aqueous ice slurry distribution conduit having an inlet communicating with the freeze exchanger means and an outlet communicating with a mixer in which warm water and ice slurry are mixed and the ice is melted and cold water is formed;
    a heat exchanger means into which a fluid flows and is cooled by indirect heat exchange with cold water flowing through the heat exchanger means and forming warm water;
    a cold water conduit for feeding cold water from the mixer to the heat exchanger means;
    a warm water return conduit for withdrawing warm water from the heat exchanger means and feeding the warm water to an ice storage tank to cool the warm water;
    a conduit for withdrawing cold water from the ice storage tank and feeding it to the freeze exchanger means to produce aqueous ice slurry; and
    a warm water recirculation conduit communicating with the heat exchanger means and with the mixer for recirculating warm water from the warm water return conduit to the mixer to melt ice in the aqueous ice slurry.

10. Apparatus according to claim 9 including a conduit for diverting aqueous ice slurry from the aqueous ice slurry distribution conduit to the ice storage tank.

11. Apparatus according to claim 9 in which:
    the warm water return conduit includes a control valve downstream of the warm water recirculation conduit.

12. Apparatus according to claim 11 in which the fluid is air and the heat exchanger means is an air handler having means which is responsive to the temperature of the air downstream of the heat exchanger means to regulate the control valve.

13. Apparatus according to claim 9 including:
    control means for controlling the flow of warm water from the heat exchanger means to the freeze exchanger means in response to the temperature of the cooled fluid.

14. Apparatus according to claim 9 including a recirculation pump in the warm water recirculation conduit.

15. Apparatus according to claim 9 including:
    control means for controlling the recirculation flow rate of warm water to the mixer, said control means including means for measuring the temperature of the warm water in the warm water return conduit.

16. A cooling apparatus comprising:
    freeze exchanger means in which an aqueous ice slurry is produced;
    at least first and second spaced apart separate heat exchangers into which a fluid can flow and be cooled by indirect heat exchange with cold water flowing through the heat exchangers and forming warm water;
    an aqueous ice slurry distribution conduit having an inlet communicating with the freeze exchanger means;
    a first branch conduit communicating with the ice slurry distribution conduit and with a first mixer in which warm water and ice slurry are mixed, the ice is melted and cold water is formed;
    a cold water conduit for feeding cold water from the first mixer to the first heat exchanger;
    a first warm water return branch conduit for withdrawing warm water from the first heat exchanger and feeding it to a main warm water recycling means communicating with the freeze exchanger means to return the water to the freeze exchanger means;

a first warm water recirculation circuit communicating with the first warm water return branch conduit and with the first mixer for recirculating warm water from the first warm water return branch conduit to the first mixer to melt ice in the aqueous ice slurry;

a second branch conduit communicating with the ice slurry distribution conduit and with a second mixer in which water and ice slurry are mixed, the ice is melted and cold water is formed;

a cold water conduit for feeding cold water from the second mixer to the second heat exchanger;

a second warm water return branch conduit for withdrawing warm water from the second heat exchanger and feeding it to the main warm water recycling means communicating with the freeze exchanger means to return the water to the freeze exchanger means; and a second warm water recirculation conduit communicating with the second warm water return branch conduit and with the second mixer for recirculating warm water from the second warm water return branch conduit to the second mixer to melt ice in the aqueous ice slurry and form cold water.

17. Apparatus according to claim 16 in which:
each of the first and second warm water return branch conduits includes a control valve downstream of the respective first and second warm water recirculation conduits.

18. Apparatus according to claim 16 in which the fluid is air and each of the heat exchangers is an air handler.

19. Apparatus according to claim 16 including:
control means for controlling the flow of warm water from the first heat exchanger to the freeze exchanger means in response to the temperature of the cooled fluid; and
control means for controlling the flow of warm water from the second heat exchanger means to the freeze exchanger means in response to the temperature of the cooled fluid.

20. Apparatus according to claim 16 including a recirculation pump in each of the warm water recirculation conduits.

21. Apparatus according to claim 16 including:
control means for controlling the recirculation flow rate of warm water to the mixer by measuring the temperature of the warm water in the first warm water return branch conduit; and
control means for controlling the recirculation flow rate of warm water to the mixer by measuring the temperature of the warm water in the second warm water return branch conduit.

22. A cooling apparatus comprising:
freeze exchanger means in which an aqueous ice slurry is produced;
at least first and second spaced apart separate heat exchangers with each heat exchanger adapted to provide cooling to a space separate from a space served by the other heat exchanger;
each heat exchanger being adapted to cool a fluid flowing therethrough by indirect heat exchange with cold water flowing through the heat exchanger and forming warm water;

an aqueous ice slurry distribution conduit having an inlet communicating with the freeze exchanger means;

a first branch conduit communicating with the ice slurry distribution conduit and with a first mixer in which warm water and ice slurry are mixed and the ice is melted and cold water is formed;

a cold water conduit for feeding cold water from the first mixer to the first heat exchanger;

a first warm water return branch conduit for withdrawing warm water from the first heat exchanger and feeding it to a main warm water recycling means communicating with an ice storage tank to return the water to the ice storage tank to cool the water;

a conduit for withdrawing cold water from the ice storage tank and feeding it to the freeze exchanger means to produce aqueous ice slurry;

a first warm water recirculation conduit communicating with the first warm water return branch conduit and with the first mixer for recirculating warm water from the first warm water return branch conduit to the first mixer to melt ice in the aqueous ice slurry and form cold water;

a second branch conduit communicating with the ice slurry distribution conduit and with a second mixer in which warm water and ice slurry are mixed and the ice is melted and cold water is formed;

a cold water conduit for feeding cold water from the second mixer to the second heat exchanger;

a second warm water return branch conduit for withdrawing warm water from the second heat exchanger and feeding it to the main warm water recycling means communicating with the ice storage tank to return the water to the ice storage tank; and a second warm water recirculation conduit communicating with the second warm water return branch conduit and with the first mixer for recirculating warm water from the second warm water return branch conduit to the second mixer to melt ice in the aqueous ice slurry and form cold water.

23. Apparatus according to claim 22 including a conduit for diverting aqueous ice slurry from the aqueous ice slurry distribution conduit to the ice storage tank.

24. Apparatus according to claim 22 in which:
each of the first and second warm water return branch conduits includes a control valve downstream of the respective first and second warm water recirculation conduits.

25. Apparatus according to claim 24 in which the fluid is air and each heat exchanger is an air handler which includes means which is responsive to the temperature of the air downstream of the respective first or second air handler to regulate the control valve in the respective branch conduit.

26. Apparatus according to claim 22 including:
control means for controlling the flow of warm water from the first and second heat exchangers to the freeze exchanger means in response to the temperature of the cooled fluid.

27. Apparatus according to claim 22 including a recirculation pump in each of the first and second warm water recirculation conduits.

28. Apparatus according to claim 22 including:
control means for controlling the recirculation flow rate of warm water to the first and second mixers by measuring the temperature of the warm water in the first and second warm water return branch conduits.

29. A cooling apparatus comprising:
freeze exchanger means in which an aqueous ice slurry is produced;
an aqueous ice slurry distribution conduit having an inlet communicating with the freeze exchanger means and an outlet communicating with a heat exchanger means into which the slurry can flow in indirect heat exchange with a fluid which is cooled and the slurry is converted to warm water;
a warm water return conduit communicating with the heat exchanger means and with an ice storage tank for withdrawing warm water from the heat exchanger means and feeding the warm water to the ice storage tank to cool the water; and
a conduit for withdrawing cold water from the ice storage tank and feeding it to the freeze exchanger means to produce aqueous ice slurry.

30. Apparatus according to claim 29 including a conduit for diverting aqueous ice slurry from the aqueous ice slurry distribution conduit to the ice storage tank.

31. Apparatus according to claim 29 in which the warm water return conduit has a control valve.

32. Apparatus according to claim 29 in which the fluid is air and the heat exchanger means is an air handler which includes means which is responsive to the temperature of the air downstream of the air handler to regulate the control valve.

33. A cooling method comprising:
producing an aqueous ice slurry in a freeze exchanger means;
feeding the aqueous ice slurry by means of a distribution conduit to a heat exchanger means and forming warm water therein; and
withdrawing warm water from the heat exchanger means and feeding the warm water through ice in a storage tank to cool the water by heat exchange with the aqueous ice slurry and then withdrawing cold water from the storage tank and feeding the resulting cold water to the freeze exchanger means to produce aqueous ice slurry.

34. A cooling method according to claim 33 in which some of the aqueous ice slurry produced in the freeze exchanger means is fed to the ice storage tank.

35. A cooling method comprising:
producing an aqueous ice slurry in a freeze exchanger means;
withdrawing aqueous ice slurry from the freeze exchanger means and feeding the aqueous ice slurry by means of a distribution conduit to a mixer;
feeding warm water to the mixer to melt the ice and produce cold water;
feeding the cold water from the mixer through a heat exchanger means into and from which a fluid flows to thereby indirectly cool the fluid and form warm water in the heat exchanger means; and
withdrawing warm water from the heat exchanger means and feeding some of the warm water to the mixer to melt ice and recycling some of the warm water to the freeze exchanger means to produce additional aqueous ice slurry.

36. A cooling method according to claim 35 including controlling the amount of water recycled to the freeze exchanger means in response to the temperature of the fluid downstream of the heat exchanger means.

37. A cooling method according to claim 35 including controlling the warm water flow rate to the mixer according to the temperature of the warm water recycled to the freeze exchanger means to thereby maintain the recycled water temperature as high as reasonable for efficient operation of the method.

38. A cooling method according to claim 35 in which the recycled warm water is fed through a bed of ice in a storage tank to cool the water by heat exchange with the ice and the resulting cold water is fed to the freeze exchanger means to produce aqueous ice slurry.

39. A cooling method according to claim 38 in which some of the aqueous ice slurry produced in the freeze exchanger means is fed to the ice storage tank.

40. A method according to claim 35 in which the fluid is air and the heat exchanger means is an air handler.

* * * * *